Jan. 14, 1958  G. C. CROWLEY  2,820,085
FLEXIBLE THERMOSENSITIVE ELECTRIC CABLE
Filed Oct. 8, 1953
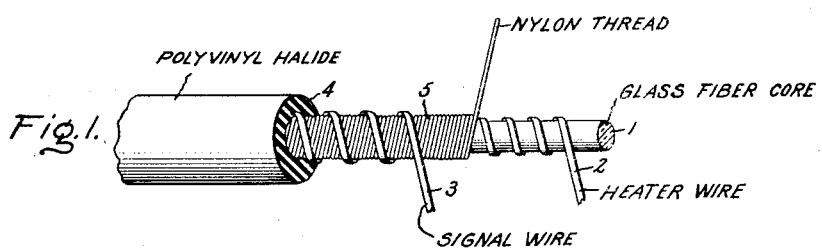
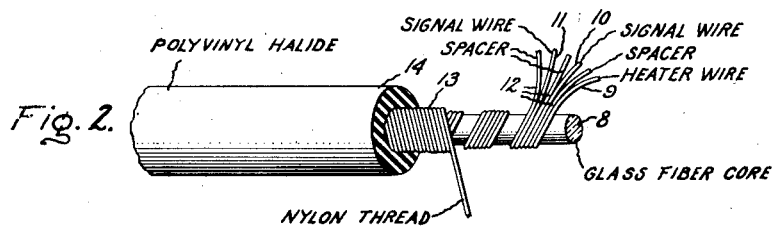
Inventor:
George C. Crowley,
by Frank L. Neuhauser
His Attorney.

2,820,085
FLEXIBLE THERMOSENSITIVE ELECTRIC CABLE

George C. Crowley, Asheboro, N. C., assignor to General Electric Company, a corporation of New York Application October 8, 1953, Serial No. 384,826

3 Claims. (Cl. 174—107)

There is now in use, primarily in electric blankets, cable which comprises an electric heating resistor wire and a signal wire separated from each other by an organic material which at a lower temperature is essentially an insulator and at a higher temperature becomes an electrical conductor which will permit of the flow of significant current. Suitable control means is provided for connecting such cable to an electric source; and flow of current between the two wires of the cable is used as an indication of overheating and for disconnecting the cable from the source of current to which it is connected. A known cable of this type is disclosed in the patent to Spooner et al. 2,581,212, patented January 1, 1952, and assigned to the same assignee as is the instant application.

The cable shown in the Spooner et al. patent comprises essentially a core of flexible insulating material such as glass fiber on which is spirally wound a bare ribbon-like conductor which forms the heater wire of the cable. Extruded over the heater wire in close contact therewith is a layer or film of organic material having the property referred to in the preceding paragraph, and spirally wound tightly over such layer or film is a bare conductor wire which forms the signal wire of the cable. Then over the signal wire is an outer over-all covering of insulating material such as a polyvinyl halide. The organic insulating material used has been nylon, it having been found to be very satisfactory for use in electric blanket cable. The several wires are wound spirally in order to give the cable the needed flexibility and life. The cable must be extremely flexible and capable of standing severe and extensive flexing without breaking. The described cable has been very satisfactory in use.

The object of my present invention is to provide an improved construction and arrangement in a cable of the type just described which is more flexible and has a greater flex life than such cable and at the same time is lower in cost, and for a consideration of what I believe to be novel and my invention attention is directed to the following specification and to the claims appended thereto.

According to my present invention, I utilize a core, heater and signal wires, and an over-all outer covering as heretofore, but instead of utilizing between the heater wire and the signal wire an extruded on layer or film of organic material having the property referred to I utilize a layer or film of such material in the form of a spirally wound thread. In other words in the cable I substitute for the heretofore extruded on layer, a layer which comprises spirally wound thread. Cable embodying my invention may take various specific forms and may embody two wires, a heater wire and a signal wire, or more than two wires, for example, a heater wire and two signal wires. In this application, by way of examples, I have disclosed two specific forms of the invention.

In the drawing Fig. 1 is a view of a length of wire illustrating one form of the invention.

Fig. 2 is a view similar to Fig. 1 showing another form of the invention.

Referring to Fig. 1 of the drawing, 1 indicates the core of the cable which may be formed of glass fiber or other suitable flexible insulating material, 2 indicates a heater wire spirally wound on the core, which may be a flat copper ribbon, 3 indicates a signal wire spirally wound in a direction the same as that of the heater wire, and 4 indicates an over-all covering of insulating material which may be a suitable polyvinyl halide. According to this embodiment of the invention, the heater wire and the signal wire are separated by a layer 5 of organic insulating material of the type referred to above which is in the form of spirally wound thread, for example, nylon thread, the layer being located on top of the heater wire and beneath the signal wire and being spiraled in a direction opposite to that in which the heater and signal wires are wound. In other words, the heater wire is first wound on the core, the nylon thread then wound over the heater wire, and the signal wire then wound over the nylon thread.

In Fig. 2 is shown an embodiment of the invention wherein the heater and signal wires instead of being wound directly over each other with the layer of thread formed of the organic material between them, are wound side by side on the glass fiber core with a spaced thread of a suitable insulating material wound between them; and the thread of the organic material is wound directly on top of the wires to span them, thereby providing between successive turns of the wires connecting means of the organic material.

In Fig. 2, 8 indicates the glass fiber core, 9 indicates a heater wire, and 10 and 11 indicate signal wires, two signal wires being shown in the present instance, although the cable may embody only a single signal wire. Wires 9, 10 and 11 are separated from each other by spacer threads 12 of suitable insulating material such as glass fiber thread. Wound directly over core 8, wires 9, 10 and 11 and threads 12 is a layer 13 comprising spirally wound thread formed from the organic material such as a nylon; and over layer 13 is the over-all insulating covering 14. The wires 9, 10 and 11 and the spacer threads 12 may be wound on the core all at the same time, a thing of advantage from a manufacturing standpoint, after which the thread which forms layer 13 may be wound on followed by the over-all covering.

The utilization of an organic layer of insulating material in the form of a spirally wound thread as opposed to an extruded covering has the advantages that it provides a cable which is more flexible and has greater flex life than similar cables heretofore used (a thing of especial importance in cable for electric bed coverings), and which can be manufactured at lower cost in that a wound on threaded covering can be applied with simple machinery and at lower cost than an extruded covering.

The specific construction of Fig. 2 has especial advantage in instances where the cable comprises more than two conductors since it enables all the conductors to be wound simultaneously along with the spacer threads of insulating material and enables a single layer of the nylon thread to contact all the wires.

What I claim as new and desire to secure by Letters Patent of the United States is:

1. In an electric cable, a core of flexible insulating material, a plurality of flexible conductors with the metallic surfaces exposed spirally wound side by side on said core at a pitch providing physical separation between adjacent conductor turns, insulating spacing means between said conductors to maintain said separation between adjacent conductors, a layer of organic material over said conductors and insulating spacing means which at a lower temperature is essentially an insulator and at a higher temperature becomes an electrical conductor which will permit of the flow of significant current comprising spirally wound thread of a pitch providing physical contact between adjacent turns, and an over-all insulating covering over such layer.

2. The combination defined by claim 1 wherein the insulating spacing means between the spirally wound conductors comprises spirally wound thread.

3. The combination defined by claim 1 wherein the thread is wound in a direction opposite to that of said conductors.

References Cited in the file of this patent

UNITED STATES PATENTS

| | | |
|---|---|---|
| 2,450,429 | Henning | Oct. 5, 1948 |
| 2,581,212 | Spooner et al. | Jan. 1, 1952 |